United States Patent
Lee et al.

(10) Patent No.: US 9,240,607 B2
(45) Date of Patent: Jan. 19, 2016

(54) POLYMER ELECTROLYTE AND PREPARATION METHOD THEREOF

(75) Inventors: Dong Hoon Lee, Goyang-si (KR); Na Young Kim, Yongin-si (KR); Moo Seok Lee, Seoul (KR); Yong Cheol Shin, Seoul (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 235 days.

(21) Appl. No.: 13/876,101

(22) PCT Filed: Apr. 2, 2012

(86) PCT No.: PCT/KR2012/002475
§ 371 (c)(1),
(2), (4) Date: Mar. 26, 2013

(87) PCT Pub. No.: WO2012/134254
PCT Pub. Date: Oct. 4, 2012

(65) Prior Publication Data
US 2013/0177834 A1 Jul. 11, 2013

(30) Foreign Application Priority Data
Mar. 31, 2011 (KR) .................. 10-2011-0029839

(51) Int. Cl.
*H01M 8/10* (2006.01)
*C08J 5/22* (2006.01)
*C08F 283/00* (2006.01)
*C08G 65/48* (2006.01)
*C08L 71/00* (2006.01)
*H01B 1/12* (2006.01)

(52) U.S. Cl.
CPC ........... *H01M 8/1072* (2013.01); *C08F 283/00* (2013.01); *C08G 65/48* (2013.01); *C08J 5/2275* (2013.01); *C08L 71/00* (2013.01); *H01B 1/122* (2013.01); *H01M 8/1062* (2013.01); *C08G 2261/3442* (2013.01); *C08G 2650/40* (2013.01); *C08J 2371/12* (2013.01); *H01M 8/103* (2013.01); *H01M 8/1023* (2013.01); *H01M 8/1025* (2013.01); *H01M 8/1027* (2013.01); *H01M 8/1032* (2013.01); *H01M 8/1034* (2013.01); *H01M 8/1039* (2013.01); *Y02E 60/521* (2013.01)

(58) Field of Classification Search
CPC ........... H01M 8/1072; H01M 8/1062; H01M 8/1023; H01M 8/1025; H01M 8/103; H01M 8/1032; H01M 8/1034; H01M 8/1039; C08J 5/2275; C08J 2371/12; H01B 1/122; C08F 283/00; C08G 65/48; C08G 2261/3442; C08G 2650/40; C08L 71/00; Y02E 60/521
USPC ............................ 521/27; 429/494, 492, 493
See application file for complete search history.

(56) References Cited

U.S. PATENT DOCUMENTS

| | | | | |
|---|---|---|---|---|
| 7,052,793 | B2 * | 5/2006 | Formato et al. | 429/535 |
| 7,550,216 | B2 | 6/2009 | Ofer et al. | |
| 7,811,694 | B2 * | 10/2010 | Song et al. | 429/491 |
| 2012/0231355 | A1 * | 9/2012 | Lee et al. | 429/409 |

FOREIGN PATENT DOCUMENTS

| | | |
|---|---|---|
| JP | 2002-216800 A | 8/2002 |
| JP | 2004-273298 A | 9/2004 |
| JP | 2008-041377 A | 2/2008 |
| JP | 2009-093919 A | 4/2009 |
| JP | 2009-193725 A | 8/2009 |
| JP | 2009-252723 A | 10/2009 |
| KR | 10-0684730 B1 | 2/2007 |
| WO | 2011025259 A2 | 3/2011 |

OTHER PUBLICATIONS

Japan Patent Office, Communication dated Apr. 21, 2015, issued in corresponding Japanese Application No. 2013-544408.

* cited by examiner

*Primary Examiner* — Michael M Bernshteyn
(74) *Attorney, Agent, or Firm* — Sughrue Mion, PLLC

(57) ABSTRACT

Provided are a polymer electrolyte membrane used in fuel cells, and a method for producing the same, the method including a step of filling a crosslinkable ion conductor in the pores of a porous nanoweb support; and a step of crosslinking the ion conductor filled in the pores of the porous nanoweb support. The method for producing a polymer electrolyte membrane uses a relatively smaller amount of an organic solvent, can ameliorate defects of the support caused by solvent evaporation, and can enhance the impregnability of the ion conductor to the support and the convenience of the process.

6 Claims, 1 Drawing Sheet

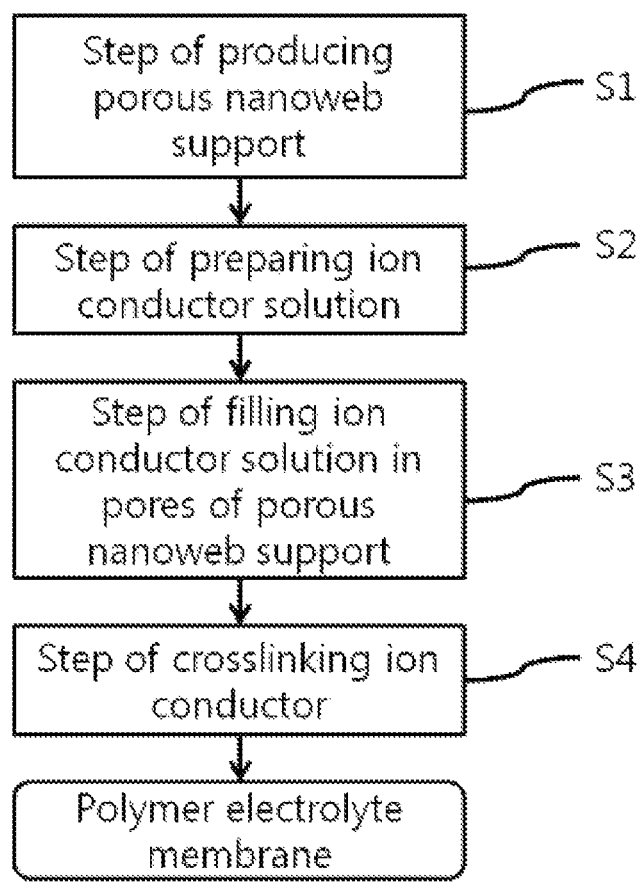

POLYMER ELECTROLYTE AND PREPARATION METHOD THEREOF

TECHNICAL FIELD

The present invention relates to an electrolyte used in fuel cells, and more particularly, to a polymer electrolyte membrane for fuel cells.

BACKGROUND ART

Fuel cells are cells that directly convert the chemical energy generated by oxidation of a fuel to electrical energy, and attention is being paid to the fuel cells as a next-generation energy source due to their environment-friendly features of high energy conversion efficiency and reduced contaminant discharge.

A fuel cell generally has a structure in which an anode and a cathode are formed, with an electrolyte membrane interposed therebetween, and such a structure is called a membrane-electrode assembly (MEA).

Fuel cells can be classified into alkaline electrolyte fuel cells, polymer electrolyte membrane fuel cells (PEMFC), and the like, and among them, polymer electrolyte membrane fuel cells are attracting more attention as power source apparatuses for portable, automobile and domestic applications, due to their advantages such as a low operation temperature such as below 100° C., fast starting and fast response characteristics, and excellent durability.

A representative example of such a polymer electrolyte membrane fuel cell is a proton exchange membrane fuel cell (PEMFC) that uses hydrogen gas as the fuel.

To briefly describe the reaction occurring in a polymer electrolyte membrane fuel cell, first, when a fuel such as hydrogen gas is supplied to an anode, an oxidation reaction of hydrogen occurs at the anode, and thereby hydrogen ions ($H^+$) and electrons ($e^-$) are produced. The hydrogen ions ($H^+$) thus produced are transferred to a cathode through a polymer electrolyte membrane, and electrons ($e^-$) thus produced are transferred to the cathode through an external circuit. Oxygen is supplied to the cathode, and oxygen binds with hydrogen ions ($H^+$) and electrons ($e^-$), and water is produced by a reduction reaction of oxygen.

Since the polymer electrolyte membrane is a channel through which the hydrogen ions ($H^+$) produced at the cathode are transferred to the cathode, the polymer electrolyte membrane should essentially have excellent conductivity for hydrogen ions ($H^+$). Furthermore, the polymer electrolyte membrane should have excellent separation capability of separating hydrogen gas that is supplied to the anode and oxygen that is supplied to the cathode, and should also have excellent mechanical strength, dimensional stability, chemical resistance and the like, and characteristics such as a small ohmic loss at a high current density are required.

One of those polymer electrolyte membranes that are currently in use may be an electrolyte membrane made of a perfluorosulfonic acid resin as a fluororesin (hereinafter, referred to as "fluorine ion conductor"). However, a fluorine ion conductor has weak mechanical strength, and thus has a problem that when used for a long time, pinholes are generated, and thereby the energy conversion efficiency is decreased. In order to increase the mechanical strength, there has been an attempt of using a fluorine ion conductor having an increased membrane thickness; however, in this case, there is a problem that the ohmic loss is increased, and the use of expensive materials increases, so that the economic efficiency is low.

In order to address such problems, there has been suggested a polymer electrolyte membrane having enhanced mechanical strength by impregnating a porous polytetrafluoroethylene resin (trade name: TEFLON) (hereinafter, referred to as "Teflon resin"), which is a fluororesin, with a liquid-state fluorine ion conductor. In this case, the hydrogen ion conductivity may be somehow inferior as compared with polymer electrolyte membranes composed of a fluorine ion conductor alone; however, the impregnated polymer electrolyte membrane is advantageous in that the polymer electrolyte membrane has relatively superior mechanical strength, and can therefore have a reduced thickness, so that the ohmic loss is decreased.

However, since a Teflon resin has very poor adhesiveness, there are limitations on the selection of the ion conductor, and in the case of products produced by applying fluorine ion conductors, the products have a disadvantage that the fuel crossover phenomenon occurs conspicuously as compared with hydrocarbon-based ion conductors. Furthermore, because not only fluorine ion conductors but also porous Teflon resins are highly expensive, there still is a demand for the development of a new inexpensive material for the mass production of fuel cells.

DISCLOSURE

Technical Problem

An object of the present invention is to provide a method for producing a polymer electrolyte membrane, which uses a relatively smaller amount of an organic solvent, can improve defects of the support caused by solvent evaporation, and can enhance the ability of the ion conductor to impregnate the support, and the convenience of the process.

Another object of the present invention is to provide a polymer electrolyte membrane having enhanced dimensional stability and tensile strength.

Technical Solution

In order to achieve the objects described above, the method for producing a polymer electrolyte membrane according to an aspect of the present invention includes a step of filling a crosslinkable ion conductor in the pores of a porous nanoweb support; and a step of crosslinking the ion conductor filled in the pores of the porous nanoweb support. The crosslinking of the ion conductor may be carried out by applying heat at a temperature of 150° C. to 200° C.

The crosslinkable ion conductor may be a low molecular weight ion conductor having a weight average molecular weight of 1,000 g/mol to 50,000 g/mol.

The crosslinkable ion conductor may contain any one crosslinkable substituent selected from the group consisting of a monovalent aliphatic hydrocarbon containing a carbon-carbon triple bond, a monovalent aliphatic hydrocarbon containing a carbon-carbon double bond, an epoxy group, and combinations thereof, at any one position selected from the group consisting of the main chain, the chain ends, and combinations thereof.

The crosslinkable ion conductor may be any one selected from the group consisting of a sulfonated polyimide (S-PI), a sulfonated polyarylethersulfone (S-PAES), a sulfonated polyether ether ketone (S-PEEK), a sulfonated polybenzimidazole (S-PBI), a sulfonated polysulfone (S-PSU), a sulfonated polystyrene (S-PS), a sulfonated polyphosphazene, and combinations thereof.

The crosslinkable ion conductor may be a compound represented by the following formula (1):

[Chemistry Figure 1]

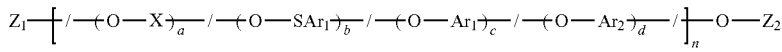

wherein in the formula (1), $SAr_1$ represents a divalent sulfonated aromatic hydrocarbon; $Ar_1$ and $Ar_2$ each independently represent a divalent aromatic hydrocarbon; X represents a divalent aromatic hydrocarbon containing a crosslinkable substituent; $Z_1$ and $Z_2$ each independently represent a crosslinkable substituent or a monovalent aromatic hydrocarbon containing a crosslinkable substituent; a, c and d each independently represent a number from 0 to 0.999; b represents a number from 0.001 to 1.000; and n represents an integer from 10 to 500.

$SAr_1$ may be any one selected from the group consisting of compounds represented by the following formulas (2-1) to (2-4):

[Chemistry Figure 2-1]

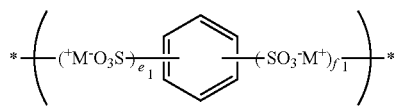

[Chemistry Figure 2-2]

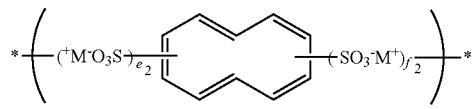

[Chemistry Figure 2-3]

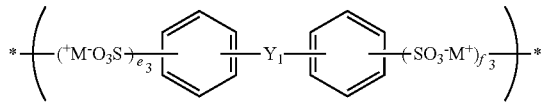

[Chemistry Figure 2-4]

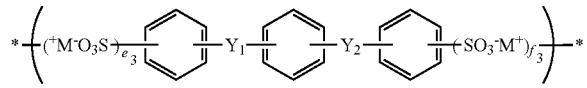

$Ar_1$ and $Ar_2$ each independently represent any one selected from the group consisting of compounds represented by the following formulas (3-1) and (3-2):

[Chemistry Figure 3-1]

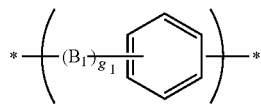

[Chemistry Figure 3-2]

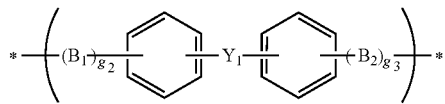

X may be any one selected from the group consisting of compounds represented by the following formulas (4-1) and (4-2):

[Chemistry Figure 4-1]

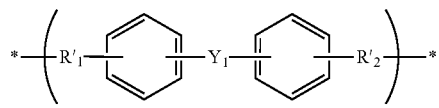

[Chemistry Figure 4-2]

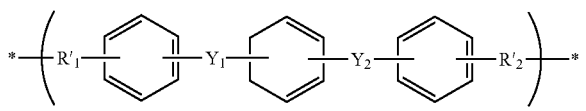

$Z_1$ and $Z_2$ each independently represent any one selected from the group consisting of compounds represented by the following formulas (5-1) to (5-4):

[Chemistry Figure 5-1]

[Chemistry Figure 5-2]

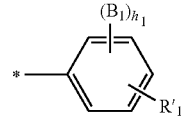

[ChemistryFigure 5-3]

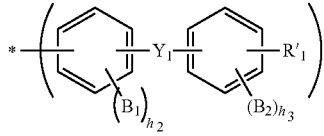

[Chemistry Figure 5-4]

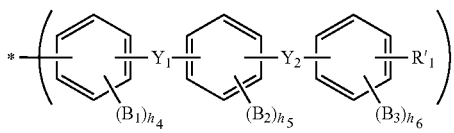

In the formulas (2) to (5), $B_1$ to $B_3$ each independently represent any one selected from the group consisting of a halogen group, an alkyl group having 1 to 5 carbon atoms, and a perfluoroalkyl group having 1 to 5 carbon atoms; $R'_1$ and $R'_2$ each independently represent any one selected from the group consisting of

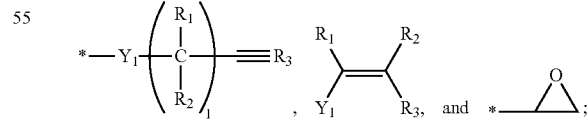

$M^+$ represents a counter cation having a monovalent positive charge; $e_1$ represents an integer of 0 or 1; $f_1$ represents an integer from 1 to 3; $e_2$ represents an integer of 0 or 3; $f_2$ represents an integer from 1 to 3; $e_3$ represents an integer of 0 or 4; $f_3$ represents an integer from 1 to 4; $g_1$ to $g_3$ each independently represent an integer from 0 to 4; $h_1$ to $h_6$ each independently represent an integer from 0 to 4; i represents an integer from 0 to 2; $Y_1$ and $Y_2$ each independently represent any one selected from the group consisting of a single bond,

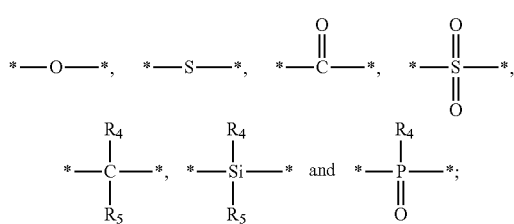

and $R_1$ to $R_5$ each independently represent any one selected from the group consisting of a hydrogen atom, a halogen group, an alkyl group having 1 to 5 carbon atoms, and a perfluoroalkyl group having 1 to 5 carbon atoms.

According to another aspect of the present invention, there is provided a polymer electrolyte membrane including a porous nanowet support, and an ion conductor that is filled inside the porous nanoweb support and is crosslinked.

The crosslinked ion conductor may be any one selected from the group consisting of a crosslinked sulfonated polyimide, a crosslinked sulfonated polyarylethersulfone, a crosslinked sulfonated polyether ether ketone, a crosslinked sulfonated polybenzimidazole, a crosslinked sulfonated polysulfone, a crosslinked sulfonated polystyrene, a crosslinked sulfonated polyphosphazene, and combinations thereof.

The crosslinked ion conductor may be a crosslinked product of a compound represented by the following formula (1):

[Chemistry Figure 1]

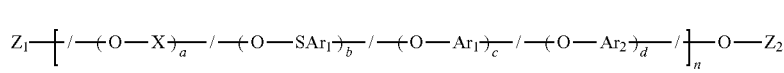

wherein in the formula (1), $SAr_1$ represents a divalent sulfonated aromatic hydrocarbon; $Ar_1$ and $Ar_2$ each independently represent a divalent aromatic hydrocarbon; X represents a divalent aromatic hydrocarbon containing a crosslinkable substituent; $Z_1$ and $Z_2$ each independently represent a crosslinkable substituent a monovalent aromatic hydrocarbon containing a crosslinkable substituent; a, c and d each independently represent a number from 0 to 0.999; b represents a number from 0.001 to 1.000; and n represents an integer from 10 to 500.

$SAr_1$ may be any one selected from the group consisting of compounds represented by the following formulas (2-1) to (2-4):

[Chemistry Figure 2-1]

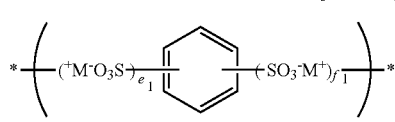

[Chemistry Figure 2-2]

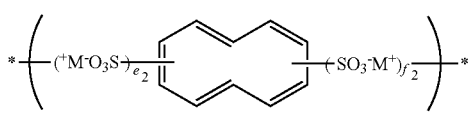

[Chemistry Figure 2-3]

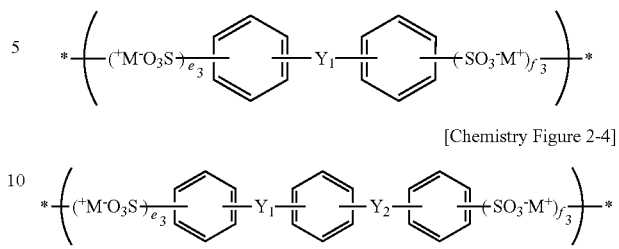

[Chemistry Figure 2-4]

$Ar_1$ and $Ar_2$ each independently represent any one selected from the group consisting of compounds represented by the following formulas (3-1) and (3-2):

[Chemistry Figure 3-1]

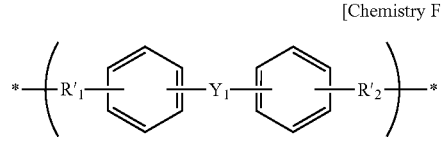

[Chemistry Figure 3-2]

X may be any one selected from the group consisting of compounds represented by the following formulas (4-1) and (4-2):

[Chemistry Figure 4-1]

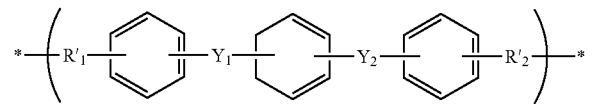

[Chemistry Figure 4-2]

$Z_1$ and $Z_2$ each independently represent any one selected from the group consisting of compounds represented by the following formulas (5-1) to (5-4):

[Chemistry Figure 5-1]

[Chemistry Figure 5-2]

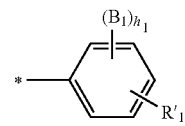

[Chemistry Figure 5-3]

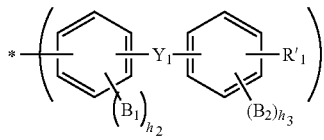

[Chemistry Figure 5-4]

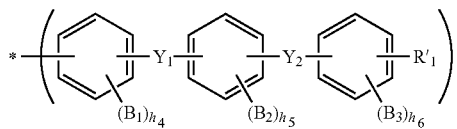

In the formulas (2) to (5), $B_1$ to $B_3$ each independently represent any one selected from the group consisting of a halogen group, an alkyl group having 1 to 5 carbon atoms, and a perfluoroalkyl group having 1 to 5 carbon atoms; $R'_1$ and $R'_2$ each independently represent any one selected from the group consisting of

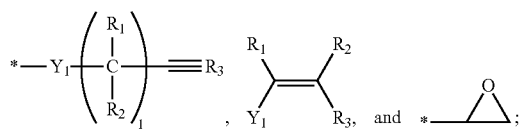

$M^+$ represents a counter cation having a monovalent positive charge; $e_1$ represents an integer of 0 or 1; $f_1$ represents an integer from 1 to 3; $e_2$ represents an integer of 0 or 3; $f_2$ represents an integer from 1 to 3; $e_3$ represents an integer of 0 or 4; $f_3$ represents an integer from 1 to 4; $g_1$ to $g_3$ each independently represent an integer from 0 to 4; $h_1$ to $h_6$ each independently represent an integer from 0 to 4; i represents an integer from 0 to 2; $Y_1$ and $Y_2$ each independently represent any one selected from the group consisting of a single bond,

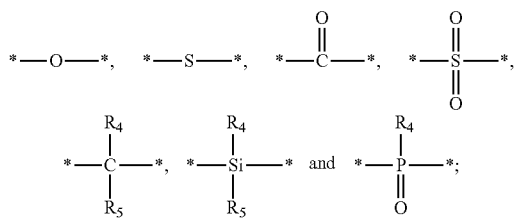

and $R_1$ to $R_5$ each independently represent any one selected from the group consisting of a hydrogen atom, a halogen group, an alkyl group having 1 to 5 carbon atoms, and a perfluoroalkyl group having 1 to 5 carbon atoms.

The porous nanoweb support may contain any one selected from the group consisting of nylon, polyimide, polybenzoxazole, polyethylene terephthalate, polyethylene, polypropylene, polytetrafluoroethylene, polyarylene ether sulfone, polyether ether ketone, copolymers thereof, and combinations thereof.

The porous nanoweb support may contain nanofibers having an average diameter of 0.005 μm to 5 μm.

The porous nanoweb support may have a porosity of 50% to 98%, and may have pores having an average diameter of 0.05 μm to 30 μm.

Advantageous Effects

The method for producing a polymer electrolyte membrane according to the present invention uses a relatively smaller amount of an organic solvent, can ameliorate the defects of the support caused by solvent evaporation, and can enhance the impregnability of the ion conductor to the support and the convenience of the process. Furthermore, the polymer electrolyte membrane according to the present invention has enhanced dimensional stability and tensile strength.

DESCRIPTION OF DRAWINGS

FIG. 1 is a process flow diagram showing the method for producing a polymer electrolyte membrane according to an embodiment of the present invention.

BEST MODE

Hereinafter, the present invention will be described in more detail.

The definitions of the terms used in the present specification are as follows.

Unless particularly stated otherwise herein, the alkyl group encompasses a primary alkyl group, a secondary alkyl group and a tertiary alkyl group.

Unless particularly stated otherwise herein, the perfluoroalkyl group means an alkyl group in which a portion of the hydrogen atoms or all the hydrogen atoms have been substituted by fluorine atoms.

Unless particularly stated otherwise herein, the halogen group means any one selected from a fluorine atom, a chlorine atom, a bromine atom, and an iodine atom.

Unless particularly stated otherwise herein, all the compounds or substituents may be substituted or unsubstituted. Here, the term "substituted" means that a hydrogen atom in such a compound or substituent has been replaced by any one selected from the group consisting of a halogen atom, a hydroxyl group, a carboxyl group, a cyano group, a nitro group, an amino group, a thio group, a methylthio group, an alkoxy group, a nitrile group, an aldehyde group, an epoxy group, an ether group, an ester group, a carbonyl group, an acetal group, a ketone group, an alkyl group, a perfluoroalkyl group, a cycloalkyl group, a heterocycloalkyl group, an allyl group, a benzyl group, an aryl group, a heteroaryl group, derivatives thereof, and combinations thereof.

Unless particularly stated otherwise herein, the aliphatic hydrocarbon is a hydrocarbon compound having 1 to 30 carbon atoms, which does not contain a benzene ring, and the aliphatic hydrocarbon may have a chain-like structure, a branched structure, or a non-aromatic cyclic structure. Aliphatic hydrocarbons can be classified into alkanes in which the molecular chain contains single bonds only, alkenes in which the molecular chain contains doubles bonds, alkynes in which the molecular chain contains triple bonds, and the like. Examples of the aliphatic hydrocarbon include chain-like hydrocarbons, higher fatty acids, and esters thereof.

Unless particularly stated otherwise herein, the aromatic hydrocarbon means a monocyclic or polycyclic compound having 6 to 30 carbon atoms and containing one or more benzene ring, or a derivative thereof, and examples thereof include phenyl compounds having a benzene ring; compounds having a benzene ring with alkyl branches, such as toluene and xylene; compounds having two or more benzene rings linked via a single bond, such as biphenyl; compounds having a benzene ring fused with a cycloalkyl group or a heterocycloalkyl group, such as fluorene, xanthene and anthraquinone; and compounds having two or more fused benzene rings, naphthalene and anthracene.

The polymer electrolyte membrane according to an embodiment of the present invention includes a porous nanoweb support, and an ion conductor that is filled in the inside of the porous nanoweb support and is crosslinked.

The porous nanoweb support is composed of aggregates of nanofibers that are three-dimensionally connected in an irregular and non-continuous manner, and therefore, the porous nanoweb support contains a large number of pores that are uniformly distributed. The porous nanoweb support containing a large number of uniformly distributed pores has excellent gas or ion conductivity.

The pore diameter, which is the diameter of the pores formed in the porous nanoweb support, may be in the range of 0.05 μm to 30 μm. If pores are formed to have a pore diameter of less than 0.05 μm, the ion conductivity of the polymer electrolyte membrane may deteriorate, and if the pore diameter exceeds 30 μm, the mechanical strength of the polymer electrolyte membrane may deteriorate.

Furthermore, the porosity that represents the extent of formation of pores in the porous nanoweb support may be in the range of 50% to 98%. If the porosity of the porous nanoweb support is lower than 50%, the ion conductivity of the polymer electrolyte membrane may deteriorate, and if the porosity is higher than 98%, the mechanical strength and morphological stability of the polymer electrolyte membrane may deteriorate.

The porosity (%) can be calculated based on the ratio of the volume of air relative to the total volume of the porous nanoweb support, as shown by the following mathematical formula (1):

$$\text{Porosity}(\%) = (\text{volume of air/total volume}) \times 100 \quad \text{[Math FIG. 1]}$$

At this time, the total volume of the porous nanoweb support is calculated by producing a rectangular-shaped sample of the porous nanoweb support, and measuring the width, length and thickness of the sample. The volume of air in the porous nanoweb support may be obtained by measuring the mass of the porous nanoweb support sample, and then subtracting the polymer volume that has been calculated backward from the density, from the total volume of the porous nanoweb support sample.

The porous nanoweb support is composed of aggregates of nanofibers that are three-dimensionally connected in an irregular and non-continuous manner. The average diameter of the nanofiber may be in the range of 0.005 μm to 5 μm. If the average diameter of the nanofiber is less than 0.005 μm, the mechanical strength of the porous nanoweb support may be decreased, and if the average diameter of the nanofiber is greater than 5 μm, the porosity of the porous nanoweb support may not be easily controlled.

The nanofiber may be any one selected from the group consisting of fibers made of nylon, polyimide, polybenzoxazole, polyethylene terephthalate, polyethylene, polypropylene, polytetrafluoroethylene, polyarylene ether sulfone, polyether ether ketone, copolymers thereof, and combinations thereof, but the nanofiber is not intended to be limited to these.

The porous nanoweb support can be formed to have a thickness of 5 μm to 20 μm. If the thickness of the porous nanoweb support is less than 5 μm, the mechanical strength and morphological stability of the polymer electrolyte membrane may deteriorate, and if the thickness of the porous nanoweb support is greater than 20 μm, the ohmic loss of the polymer electrolyte membrane may increase.

The ion conductor is a substance that implements the function of ion conduction, which is the principal function of a polymer electrolyte membrane, and as the ion conductor, a hydrocarbon-based polymer that has excellent ion conduction function and is advantageous in terms of price can be preferably used, but the ion conductor is not limited thereto. Particularly, for the facilitation of the process of filling the ion conductor inside the pores of the porous nanoweb support, a hydrocarbon substance which is soluble in organic solvents can be more preferably used.

The ion conductor is an ion conductor obtained by filling a low molecular weight, crosslinkable ion conductor in the interior pores of the porous nanoweb support, and then crosslinking the ion conductor. In the case of filling a high molecular weight ion conductor in the porous nanoweb support, a method of preparing an ion conductor solution by dissolving the high molecular weight ion conductor in a large amount of an organic solvent, and then soaking the porous nanoweb support in the ion conductor solution, or applying the ion conductor solution on the surface of the porous nanoweb support, or the like may be used. However, in this case, in the course of removing the organic solvent from the solution, defects may be formed on the surface or in the interior of the porous nanoweb support, and such defects may cause an increase in the film resistance of the polymer electrolyte membrane and a decrease in the film performance. Therefore, in order to prevent the defects, a process of removing the organic solvent in a vacuum at a high temperature for a long time is needed.

On the other hand, since the ion conductor that is filled and crosslinked inside the porous nanoweb support uses a small amount of an organic solvent, and the organic solvent is removed during the crosslinking process, the problem of defect generation is improved, and the impregnability and the convenience of the process are enhanced. Furthermore, the ion conductor can be densely impregnated in the interior of the porous nanoweb support. Furthermore, the dimensional stability and tensile strength are improved as a result of the crosslinking of the ion conductor.

The crosslinked ion conductor may be any one selected from the group consisting of a crosslinked sulfonated polyimide, a crosslinked sulfonated polyarylethersulfone, a crosslinked sulfonated polyether ether ketone, a crosslinked sulfonated polybenzimidazole, a crosslinked sulfonated polysulfone, a crosslinked sulfonated polystyrene, a crosslinked sulfonated polyphosphazene, and combinations thereof, but the crosslinked ion conductor is not intended to be limited to these.

The crosslinked ion conductor may be a product obtained by filling a compound represented by the following formula (1) inside the porous nanoweb support, and then crosslinking the compound:

[Chemistry Figure 1]

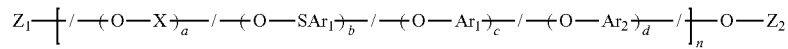

In the formula (1), $SAr_1$ represents a divalent sulfonated aromatic hydrocarbon; $Ar_1$ and $Ar_2$ each independently represent a divalent aromatic hydrocarbon; X represents a divalent aromatic hydrocarbon containing a crosslinkable substituent; and $Z_1$ and $Z_2$ each independently represent a crosslinkable substituent or a monovalent aromatic hydrocarbon containing a crosslinkable substituent.

The symbols a, c and d each independently represent a number from 0 to 0.999, and are each preferably a number from 0.001 to 0.900. b represents a number from 0.001 to 1.000, and is preferably a number from 0.098 to 0.997. n represents an integer from 10 to 500, and is preferably an integer from 50 to 350.

In the formula (1), the symbol "/" is a symbol for distinguishing the respective units of the copolymer, and implies that the respective units may be arranged regularly or irregularly within a repeating unit.

Specifically, $SAr_1$ may be any one selected from the group consisting of compounds represented by the following formulas (2-1) to (2-4):

[Chemistry Figure 2-1]

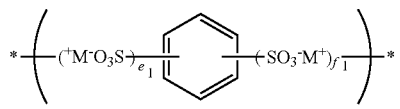

[Chemistry Figure 2-2]

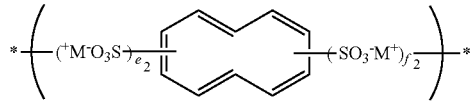

[Chemistry Figure 2-3]

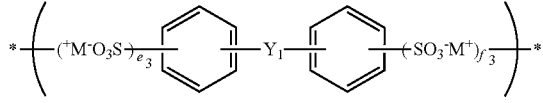

[Chemistry Figure 2-4]

*—(($^+M^-O_3S)_{e_3}$—⌬—$Y_1$—⌬—$Y_2$—⌬—($SO_3^-M^+)_{f_3}$)—*

In the formulas (2-1) to (2-4), $M^+$ represents a counter cation having a monovalent positive charge, and may be any one selected from the group consisting of $Na^+$, $K^+$, an alkylammonium ion, and a proton.

The symbol $e_1$ represents an integer of 0 or 1; $f_1$ represents an integer from 1 to 3; $e_2$ represents an integer of 0 or 3; $f_2$ represents an integer from 1 to 3; $e_3$ represents an integer of 0 or 4; and $f_3$ represents an integer from 1 to 4.

$Y_1$ and $Y_2$ may be each independently any one selected from the group consisting of a single bond,

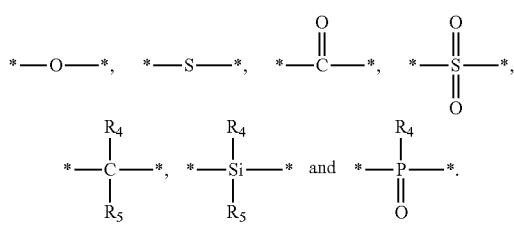

$R_4$ and $R_5$ may be each independently any one selected from the group consisting of a hydrogen atom, a halogen group, an alkyl group having 1 to 5 carbon atoms, and a perfluoroalkyl group having 1 to 5 carbon atoms.

$Ar_1$ and $Ar_2$ may be each independently any one selected from the group consisting of compounds represented by the following formulas (3-1) and (3-2):

[chemical Formula 3-1]

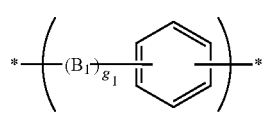

[Chemistry Figure 3-2]

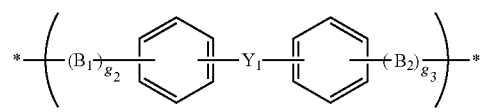

In the formulas (3-1) and (3-2), $B_1$ and $B_2$ may be each independently any one selected from the group consisting of a halogen group, an alkyl group having 1 to 5 carbon atoms, and a perfluoroalkyl group having 1 to 5 carbon atoms, and are each preferably a fluoro group.

$g_1$ to $g_3$ each independently represent an integer from 0 to 4.

$Y_1$ has the same meaning as defined in the description of the compounds represented by the formulas (2-1) to (2-4), and therefore, further specific descriptions thereon will not be repeated here.

X may be any one selected from the group consisting of compounds represented by the following formulas (4-1) and (4-2):

[Chemistry Figure 4-1]

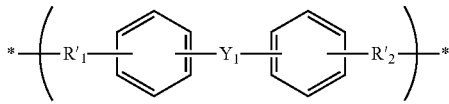

[Chemistry Figure 4-2]

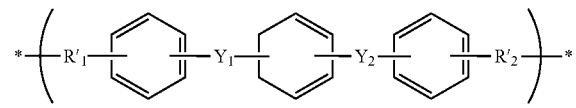

In the formulas (4-1) and (4-2), $R'_1$ and $R'_2$ may be each independently any one selected from the group consisting of

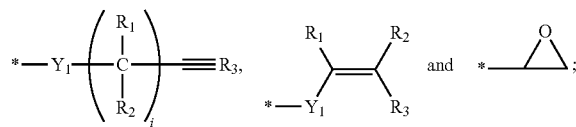

and $R_1$ to $R_3$ may be each independently any one selected from the group consisting of a hydrogen atom, a halogen group, an alkyl group having 1 to 5 carbon atoms, and a perfluoroalkyl group having 1 to 5 carbon atoms; i represents an integer from 0 to 2.

$Y_1$ and $Y_2$ have the same meanings as defined in the description of the compounds represented by the formulas (2-1) to (2-4), and therefore, further specific descriptions thereon will not be repeated here.

$Z_1$ and $Z_2$ each independently represent any one selected from the group consisting of compounds represented by the following formulas (5-1) to (5-4):

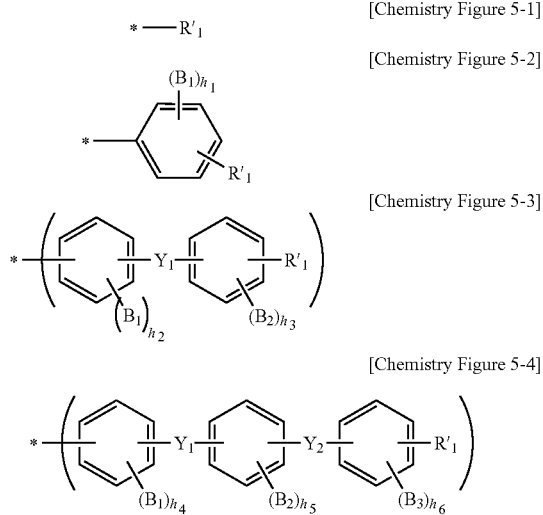

[Chemistry Figure 5-1]
[Chemistry Figure 5-2]
[Chemistry Figure 5-3]
[Chemistry Figure 5-4]

In the formula (5), $B_1$ to $B_3$ each independently represent any one selected from the group consisting of a halogen group, an alkyl group having 1 to 5 carbon atoms, and a perfluoroalkyl group having 1 to 5 carbon atoms; $h_1$ to $h_6$ each independently represent an integer from 0 to 4; R' has the same meaning as defined in the description of the compounds represented by the formulas (4-1) and (4-2), and therefore, further specific descriptions thereon will not be repeated here.

The method for producing a polymer electrolyte membrane according to another embodiment of the present invention includes a step of filling a crosslinkable ion conductor in the pores of a porous nanoweb support, and crosslinking the ion conductor filled in the pores of the porous nanoweb support.

FIG. 1 is a process flow diagram showing the method for producing a polymer electrolyte membrane according to an embodiment of the present invention. Hereinafter, the method for producing a polymer electrolyte membrane will be described with reference to FIG. 1.

The method for producing a polymer electrolyte membrane includes a step of producing a porous nanoweb support (S1); a step of dissolving a crosslinkable ion conductor in an organic solvent, and thereby preparing an ion conductor solution (S2); a step of filling the ion conductor solution in the pores of the porous nanoweb support (S3); and a step of crosslinking the ion conductor (S4).

The step (S1) of producing a porous nanoweb support includes processes of dissolving a precursor in a spinning solvent to prepare a spinning solution, spinning the spinning solution thus prepared to produce a porous nanoweb composed of nanofibers having an average diameter of 0.005 μm to 5 μm, and then treating the nanoweb thus produced by a post-treatment.

It is preferable to produce the porous nanoweb support through an electrospinning process in order to obtain a thin film having a high porosity and fine pores, but the process is not limited thereto.

The porous nanoweb support can be produced by spinning any one selected from the group consisting of nylon, polyimide, polybenzoxazole, polyethylene terephthalate, polyethylene, polypropylene, polytetrafluoroethylene, polyarylene ether sulfone, polyether ether ketone, copolymers thereof, and combinations thereof.

On the other hand, a porous nanoweb material which is insoluble in organic solvents cannot be directly produced through an electrospinning process. That is, a polyimide or polybenzoxazole that can form a porous nanoweb does not easily dissolve in organic solvents such as N-methyl-2-pyrrolidone (NMP), dimethylformamide (DMF), dimethylacetamide (DMA) and dimethyl sulfoxide (DMSO), and accordingly, it is difficult to prepare a spinning solution from the materials.

Therefore, a porous nanoweb support which is insoluble in organic solvents can be produced by first producing a precursor nanoweb using a precursor that is highly soluble in an organic solvent, and then treating the precursor nanoweb thus produced by a post-treatment so as to prevent the precursor nanoweb from dissolving in the organic solvent.

Examples of the post-treatment method for producing a non-soluble porous nanoweb from the precursor nanoweb support, include a heat treatment method and a chemical treatment method. Particularly, the heat treatment method can be carried out using a hot press set at a high temperature and a high pressure.

The production of a porous nanoweb support using a polyimide may be specifically described as follows.

A polyimide porous nanoweb support can be produced by electrospinning a polyamic acid precursor to form a nanoweb precursor, and then imidizing the nanoweb precursor using a hot press.

More specifically, a polyimide porous nanoweb support can be produced by dissolving a polyamic acid in tetrahydrofuran (THF) solvent to prepare a precursor solution; discharging the precursor solution through a spinning nozzle while a high voltage of 1 to 1,000 kV is applied at a temperature of 20° C. to 100° C., to form a polyamic acid nanoweb on a collector; and then heat treating the polyamic acid nanoweb with a hot press set to a temperature of 80° C. to 400° C.

The porous nanoweb support can improve the heat resistance, chemical resistance and mechanical properties of the polymer electrolyte membrane, as compared with polymer electrolytes produced only from ion conductors.

The crosslinkable ion conductor is filled in the pores of the porous nanoweb support (S3). Since the description on the crosslinkable ion conductor is the same as the description given for the polymer electrolyte membrane according to an embodiment of the present invention, and therefore, further specific descriptions thereon will not be repeated here.

However, the weight average molecular weight of the crosslinkable ion conductor may be 1,000 g/mol to 50,000 g/mol, and is preferably 5,000 g/mol to 20,000 g/mol. When the weight average molecular weight of the ion conductor is a low molecular weight in the range described above, the penetration of the ion conductor into the pores of the porous nanoweb support is facilitated, and the impregnability can be further improved. In regard to the method of filling, an ion conductor solution can be prepared by dissolving the crosslinkable ion conductor in a solvent (S2), and then the ion conductor solution can be used to fill in the pores (S3). In the case of utilizing the immersion process described above, it is preferable to carry out the immersion process two to five times for 5 to 30 minutes at normal temperature.

For the process of filling the crosslinkable ion conductor in the pores of the porous nanoweb support, an immersion process or an impregnation process can be used, but the process is not limited thereto, and various methods that are known in the pertinent art, such as a lamination method, a spraying method, a screen printing method, and a doctor blade method can be utilized.

Subsequently, the ion conductor filled in the pores of the porous nanoweb support is crosslinked (S4). The crosslinking of the ion conductor can be achieved by applying heat at a temperature of 150° C. to 200° C., and preferably 150° C. to 180° C. If the crosslinking temperature is higher than 200° C., sulfonic acid may be decomposed, and if the temperature is lower than 150° C., the crosslinking reaction may not occur.

applied, and thereby a polyamic acid nanoweb precursor was formed. Subsequently, the nanoweb precursor was heat treated in an oven at 350° C. for 5 hours, and thus a polyimide porous nanoweb support having an average thickness of 15 μm was produced. At this time, the electrospinning process was carried out using a spray jet nozzle at 25° C. while a voltage of 30 kV was applied.

The polyimide porous nanoweb support thus produced contained nanofibers having an average diameter of 1 μm and pores having an average diameter of 2 μm, and had a porosity of 90%.

An ion conductor represented by the following formula (6) was dissolved in N-methyl-2-pyrrolidone (NMP), and thus a 10 wt % ion conductor solution was prepared.

[Chemistry Figure 6]

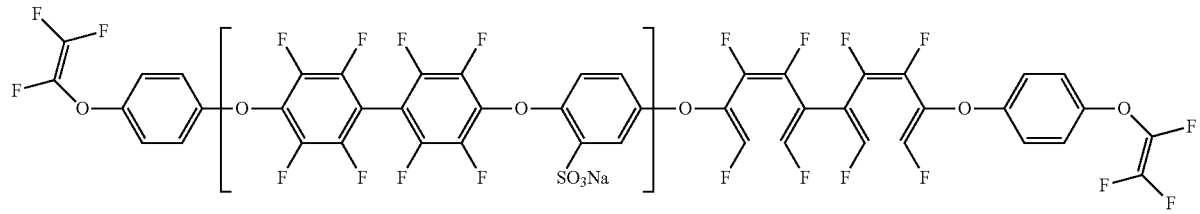

wherein in the formula (6), there are 10 to 500 repeating units.

The porous nanoweb thus produced was immersed in the ion conductor solution. Specifically, the immersion process was carried out three times for 20 minutes at normal temperature, and at this time, a reduced pressure atmosphere was applied for about one hour to eliminate fine gas bubbles. Thereafter, the ion conductor was crosslinked by heating the ion conductor at 175° C., while NMP was removed. Thus, a polymer electrolyte membrane was produced.

Mode For Invention

Hereinafter, the present invention will be described more specifically by way of Examples and Comparative Examples. However, the following Examples are only for illustrative purposes, and are not intended to limit the scope of rights of the present invention by any means.

PREPARATION EXAMPLE

Preparation of Polymer Electrolyte Membrane

Example 1

A polyamic acid/THF spinning solution at a concentration of 12 wt % was electrospun while a voltage of 30 kV was Example 2

A polymer electrolyte membrane was produced in the same manner as in Example 1, except that an ion conductor represented by the following formula (7) was used as the ion conductor.

[Chemistry Figure 7]

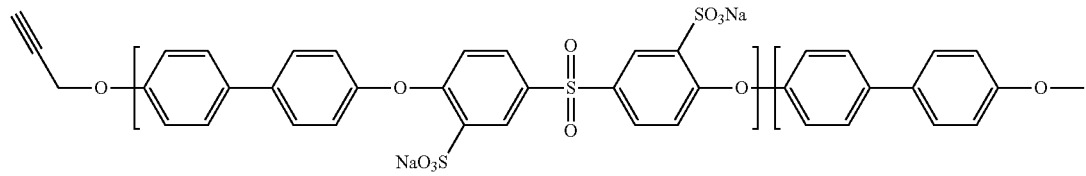

-continued

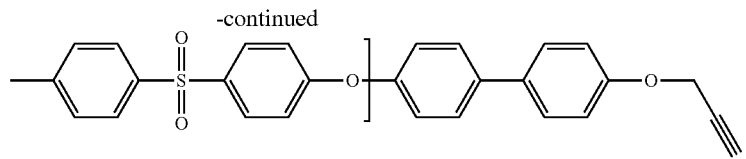

wherein in the formula (7), 0.3=x=1.0; and y=1−x.

Reference Example

A polyamic acid/THF spinning solution at a concentration of 12 wt % was electrospun while a voltage of 30 kV was applied, and thereby a polyamic acid nanoweb precursor was formed. Subsequently, the nanoweb precursor was heat treated in an oven at 350° C. for 5 hours, and thus a polyimide porous nanoweb support having an average thickness of 15 μm was produced. At this time, the electrospinning process was carried out using a spray jet nozzle at 25° C. while a voltage of 30 kV was applied. Sulfonated polyether ether ketone (S-PEEK) was dissolved in N-methyl-2-pyrrolidone (NMP), and thus a 10 wt % ion conductor solution was prepared.

The porous nanoweb support thus produced was immersed in the ion conductor solution. Specifically, the immersion process was carried out three times for 20 minutes at normal temperature, and at this time, a reduced pressure atmosphere was applied for about one hour to eliminate fine gas bubbles. Thereafter, the immersed porous nanoweb support was dried in a hot air oven maintained at 80° C. for 3 hours to remove NMP. Thus, a polymer electrolyte membrane was produced.

Experiment Example 1

Analysis of Properties of Produced Porous Nanoweb Support

The properties of the porous nanoweb supports produced in the Examples and Reference Example as described above were measured according to ASTM 638. The results are presented in the following Table 1. At this time, specific measurement conditions are as follows.
Tensile speed: 25 cm/min
Grip distance: 6.35 cm
Temperature and humidity: 25° C.×50%

TABLE 1

| Type | Strength (MPa) | Elongation (%) | Elastic modulus (MPa) |
|---|---|---|---|
| PI support | 40 | 5 | 2500 |

Experiment Example 2

Analysis of Properties of Produced Polymer Electrolyte Membrane

The properties of the polymer electrolyte membranes produced in the Examples and Reference Example as described above were measured. The results are presented in the following Table 2.
1) Measurement of Water Uptake
Each of the polymer electrolyte membranes thus produced was immersed in ultrapure water for 24 hours, and then was removed therefrom to measure the weight of the membrane in a wet state ($W_{wet}$). An identical polymer electrolyte membrane was dried in a vacuum state at 100° C. for 24 hours, and then the weight of the membrane in a dry state ($W_{dry}$) was measured. Thus, the water uptake of the membrane was calculated according to the following formula:

$$\text{Water uptake}(\%) = ((W_{wet} - W_{dry})/W_{dry}) \times 100$$

2) Measurement of Swelling Ratio
Each of the polymer electrolyte membranes thus produced was immersed in ultrapure water for 24 hours, and then was removed therefrom to measure the area ($l_{wet}$) or thickness ($t_{wet}$) in a wet state. An identical polymer electrolyte membrane was dried in a vacuum at 100° C. for 24 hours, and then the area ($l_{dry}$) or thickness ($t_{dry}$) in a dry state were measured. Thus, the swelling ratio of the membrane was calculated based on the area and the thickness according to following formulas, respectively:

$$\text{Swelling ratio}(\Delta l, \%) = ((l_{wet} - l_{dry})/l_{dry}) \times 100$$

$$\text{Swelling ratio}(\Delta t, \%) = ((t_{wet} - t_{dry})/t_{dry}) \times 100$$

TABLE 2

| Type | IEC (meq/g) | Water uptake (%) | Tensile strength (MPa) | Swelling ratio (%) Δt (%) | Δl (%) |
|---|---|---|---|---|---|
| Example 1 | 2.00 | 5 | 30 | 2 | 3 |
| Example 2 | 2.00 | 7 | 35 | 3 | 3 |
| Reference Example | 2.00 | 17 | 20 | 15 | 7 |

According to the above Table 2, in the polymer electrolyte membrane produced in the Reference Example, the dimensional stability in the thickness direction was not improved, due to the swelling of the surface layer. However, it can be seen that in the polymer electrolyte membranes produced in Examples 1 and 2, since the surface layers were also crosslinked, swelling did not occur in the surface layers, and the dimensional stability was improved.
3) Fenton Test
Each of the polymer electrolyte membrane thus produced was immersed in a Fenton's solution, which was prepared by 2 ppm of iron sulfate heptahydrate to a 3 wt % hydrogen peroxide solution, and then the occurrence of deterioration of the membrane caused by radicals was observed at 80° C. for a determined time period. Thereafter, the weights of the membrane before and after the immersion were measured. The results are presented in the following Table 3.

TABLE 3

| | Retention time | Weight change |
|---|---|---|
| Example 1 | 10 hours or longer | No weight change |
| Example 2 | 10 hours or longer | No weight change |
| Reference Example | 10 hours | Not measurable |

According to the results of the above Table 3, in the polymer electrolyte membrane produced in the Reference Example, it was impossible to measure the weight because the membrane was degraded after 10 hours of immersion in the Fenton's reagent. However, in the polymer electrolyte membranes produced in Example 1 and Example 2, no weight change was observed even after the membranes had been immersed for 10 hours or more in the Fenton's reagent. From these results, it can be seen that the polymer electrolyte membranes according to Example 1 and Example 2 had excellent resistance to radicals, and thus exhibited improved dimensional stability.

The invention claimed is:

1. A method for producing a polymer electrolyte membrane, the method comprising:
    filling a crosslinkable ion conductor in the pores of a porous nanoweb support; and
    crosslinking the ion conductor filled in the pores of the porous nanoweb support, wherein the crosslinkable ion conductor comprises one selected from the group consisting of a sulfonated polyimide (S-PI), a sulfonated polyarylethersulfone (S-PAES), a sulfonated polyether ether ketone, (S-PEEK), a sulfonated polybenzimidazole (S-PBI), a sulfonated polysulfone (S-PSU), a sulfonated polystyrene (S-PS), a sulfonated polyphosphazene, and combinations thereof.

2. The method for producing a polymer electrolyte membrane according to claim 1, wherein the crosslinking of the ion conductor is carried out by applying heat at a temperature of 150° C. to 200° C.

3. The method for producing a polymer electrolyte membrane according to claim 1, wherein the crosslinkable ion conductor has a weight average molecular weight of 1,000 g/mol to 50,000 g/mol.

4. The method for producing a polymer electrolyte membrane according to claim 1, wherein the crosslinkable ion conductor contains one crosslinkable substituent selected from the group consisting of a monovalent aliphatic hydrocarbon containing a carbon-carbon triple bond, a monovalent aliphatic hydrocarbon containing a carbon-carbon double bond, an epoxy group, and combinations thereof, at any position selected from the group consisting of the main chain, the chain ends, and combinations thereof.

5. The method for producing a polymer electrolyte membrane according to claim 1, wherein the crosslinkable ion conductor is a compound represented by the following formula (1):

[Chemistry Figure 1]

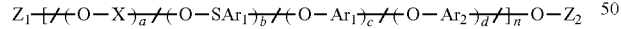

wherein in the formula (1),
    $SAr_1$ represents a divalent sulfonated aromatic hydrocarbon;
    $Ar_1$ and $Ar_2$ each independently represent a divalent aromatic hydrocarbon;
    X represents a divalent aromatic hydrocarbon containing a crosslinkable substituent;
    $Z_1$ and $Z_2$ each independently represent a crosslinkable substituent or a monovalent aromatic hydrocarbon containing a crosslinkable substituent;
    a, c and d each independently represent a number from 0 to 0.999; b represents a number from 0.001 to 1.000; and
    n represents an integer from 10 to 500.

6. The method for producing a polymer electrolyte membrane according to claim 5, wherein $SAr_1$ represents one selected from the group consisting of compounds represented by the following formulas (2-1) to (2-4):

[Chemistry Figure 2-1]

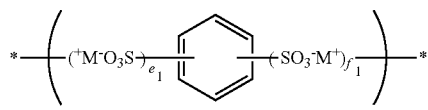

[Chemistry Figure 2-2]

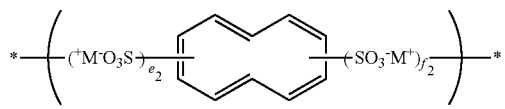

[Chemistry Figure 2-3]

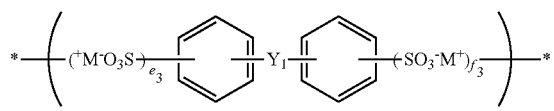

[Chemistry Figure 2-4]

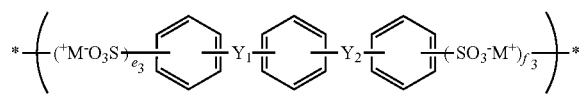

$Ar_1$ and $Ar_2$ each independently represent any one selected from the group consisting of compounds represented by the following formulas (3-1) and (3-2):

[Chemistry Figure 3-1]

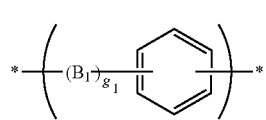

[Chemistry Figure 3-2]

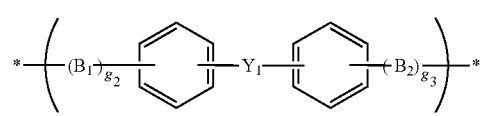

X represents any one selected from the group consisting of compounds represented by the following formulas (4-1) and (4-2):

[Chemistry Figure 4-1]

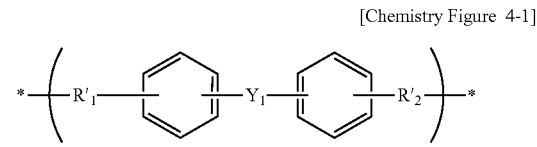

[Chemistry Figure 4-2]

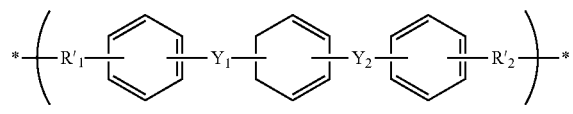

$Z_1$ and $Z_2$ each independently represent any one selected from the group consisting of compounds represented by the following formulas (5-1) to (5-4):

[Chemistry Figure 5-1]

[Chemistry Figure 5-2]

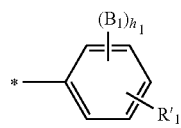

-continued

[Chemistry Figure 5-3]

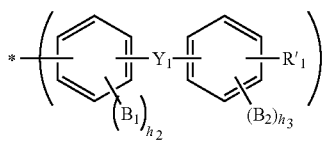

[Chemistry Figure 5-4]

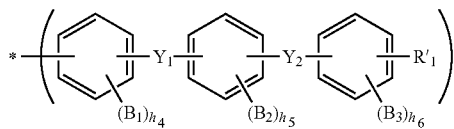

wherein in the formulas (2) to (5), $B_1$ to $B_3$ each independently represent any one selected from the group consisting of a halogen group, an alkyl group having 1 to 5 carbon atoms, and a perfluoroalkyl group having 1 to 5 carbon atoms;

$R'_1$ and $R'_2$ each independently represent any one selected from the group consisting of

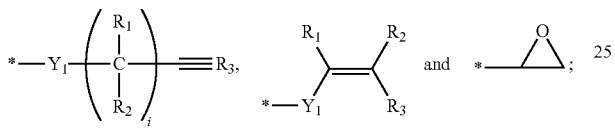

$M^+$ represents a counter cation having a monovalent positive charge;

$e_1$ represents an integer of 0 or 1; $f_1$ represents an integer from 1 to 3;

$e_2$ represents an integer of 0 or 3; $f_2$ represents an integer from 1 to 3;

$e_3$ represents an integer of 0 or 4; $f_3$ represents an integer from 1 to 4;

$g_1$ to $g_3$ each independently represent an integer from 0 to 4;

$h_1$ to $h_6$ each independently represent an integer from 0 to 4;

i represents an integer from 0 to 2;

$Y_1$ and $Y_2$ each independently represent any one selected from the group consisting of a single bond,

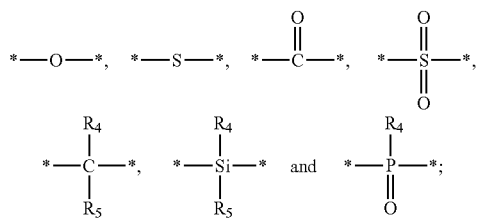

and $R_1$ to $R_5$ each independently represent any one selected from the group consisting of a hydrogen atom, a halogen group, an alkyl group having 1 to 5 carbon atoms, and a perfluoroalkyl group having 1 to 5 carbon atoms.

* * * * *